United States Patent
Pasternak et al.

(10) Patent No.: US 12,533,668 B2
(45) Date of Patent: Jan. 27, 2026

(54) PHOTOCATALYTICALLY ACTIVE SUPPORT WITH $TiO_2$ BASED MATERIALS

(71) Applicants: CENTRE NATIONAL DE LA RECHERCHE SCIENTIFIQUE, Paris (FR); CY CERGY PARIS UNIVERSITÉ, Cergy (FR); COMMISSARIAT A L'ENERGIE ATOMIQUE ET AUX ENERGIES ALTERNATIVES, Paris (FR)

(72) Inventors: Nicolas Pasternak, Avernes (FR); Nancy Linder, Neuville sur Oise (FR)

(73) Assignees: CENTRE NATIONAL DE LA RECHERCHE SCIENTIFIQUE, Paris (FR); CY CERGY PARIS UNIVERSITE, Cergy (FR); COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 818 days.

(21) Appl. No.: 17/764,764

(22) PCT Filed: Jun. 30, 2020

(86) PCT No.: PCT/EP2020/068431
§ 371 (c)(1),
(2) Date: Aug. 12, 2022

(87) PCT Pub. No.: WO2021/063554
PCT Pub. Date: Apr. 8, 2021

(65) Prior Publication Data
US 2022/0370996 A1 Nov. 24, 2022

(30) Foreign Application Priority Data
Sep. 30, 2019 (EP) .................................. 19200532

(51) Int. Cl.
*B01J 35/39* (2024.01)
*B01J 21/06* (2006.01)
(Continued)

(52) U.S. Cl.
CPC ............. *B01J 35/39* (2024.01); *B01J 21/063* (2013.01); *B01J 23/002* (2013.01);
(Continued)

(58) Field of Classification Search
CPC ............ B01J 21/063; B01J 2219/00177; B01J 2235/30; B01J 23/002; B01J 23/06;
(Continued)

(56) References Cited

FOREIGN PATENT DOCUMENTS

| CN | 104475082 A | * 4/2015 | |
|---|---|---|---|
| FR | 2975309 A1 | * 11/2012 | ............ B01J 21/063 |

(Continued)

OTHER PUBLICATIONS

Sun et al. Nanomaterials 2017, 7, 367 (Year: 2017).*
(Continued)

*Primary Examiner* — Sally A Merkling
*Assistant Examiner* — Jordan W Taylor
(74) *Attorney, Agent, or Firm* — Sughrue Mion, PLLC

(57) ABSTRACT

The present invention relates to a method for producing a support at least micrometric in size, photocatalytically active and at least in the visible range, containing nanocrystals each composed of from 80 to 100 mol % of $TiO_2$ and from 0 to 20 mol % of at least one other metal or semi-metallic oxide, comprising the following steps, from an acidic aqueous reaction medium, at a heating temperature of between 20 and 60° C.: a step of adding the titanium oxide precursor, or a mixture of the titanium oxide precursor and the precursor of the other oxide, in the acidic aqueous reaction medium, and a condensation step on or inside the support, by spraying onto the support or immersing the support in the aqueous (Continued)

reaction medium, for a specific period of condensation, a heating step, the support allowing the nanocrystals to be crystallized, without using surfactant, in the aqueous reaction medium, a step of rinsing with water and a recovery step on the one hand of the support on which the crystallization took place, these nanocrystals being attached by covalent bonds to the support, and on the other hand of a residual solution.

11 Claims, 12 Drawing Sheets

(51) Int. Cl.
    *B01J 23/00*      (2006.01)
    *B01J 35/70*      (2024.01)
    *B01J 37/02*      (2006.01)
    *B01J 37/06*      (2006.01)
    *B01J 37/08*      (2006.01)

(52) U.S. Cl.
CPC .......... *B01J 37/0207* (2013.01); *B01J 37/06* (2013.01); *B01J 37/08* (2013.01); *B01J 35/70* (2024.01); *B01J 2235/30* (2024.01); *B01J 2523/47* (2013.01); *B01J 2523/69* (2013.01)

(58) Field of Classification Search
CPC ........ B01J 23/72; B01J 23/745; B01J 23/755; B01J 2523/47; B01J 2523/69; B01J 35/39; B01J 35/393; B01J 35/70; B01J 37/0018; B01J 37/0207; B01J 37/031; B01J 37/06; B01J 37/08; C01G 23/053
See application file for complete search history.

(56) References Cited

FOREIGN PATENT DOCUMENTS

KR      2003-0027551 A      4/2003
WO      WO-2017109426 A1 *      6/2017      ............ B01J 21/063

OTHER PUBLICATIONS

Fernandez et al. Surface and Interface Analysis, 1992. 18, 392-396 (Year: 1992).*
Huo et al. CN104475082A English Machine Translation (Year: 2015).*
Khalil et al. Powder Technology 2013, 245, 156-162 (Year: 2013).*
Mouawiya et al. FR2975309A1 English Machine Translation (Year: 2012).*
Pal et al. Materials Research Bulletin 2016, 26, 353-357 (Year: 2016).*
Pasternak et al. WO2017109426A1 English Machine Translation (Year: 2017).*
International Search Report for PCT/EP2020/068431 dated Oct. 16, 2020.
Written Opinion for PCT/EP2020/068431 dated Oct. 16, 2020.

* cited by examiner

PHOTOCATALYTICALLY ACTIVE SUPPORT WITH $TiO_2$ BASED MATERIALS

CROSS REFERENCE TO RELATED APPLICATIONS

This application is a National Stage of International Application No. PCT/EP2020/068431 filed Jun. 30, 2020, claiming priority based on European Patent Application No. 19200532.0 filed Sep. 30, 2019.

FIELD OF INVENTION

The present invention relates to a method for producing a photocatalyst support at least micrometric in size and photocatalytically active at least in the visible range, and having nanocrystals on the surface thereof, each composed of from 80 to 100 mol % of $TiO_2$ and from 0 to 20 mol % of at least one other metal or semi-metallic oxide.

STATE OF THE ART $TiO_2$-based nanoparticles are used in many fields: cosmetics (sunscreen), food, pollution control, etc. These are cheap materials, hence in very common use. In recent years, some studies have warned against the dangers of using these nanometric materials (size <100 nm).

Due to their nanometric size, these materials pass through the protective barriers of living beings and accumulate in organisms, hypothetically affecting cells. The consequences for these cells are currently under much discussion: some studies report a very harmful impact up to and including cell destruction, while others have shown very minor to moderate consequences.

Self-cleaning or reflective coatings (textiles, paints, glasses, concrete, etc.) based on $TiO_2$ are known, the major problem remaining the nanometric size of titanium oxide particles that are considered hazardous for living beings. In existing methods, these titanium oxide nanocrystals, once synthesized or purchased, are imported into or onto the surface of coatings. The risk of dispersal into the environment is therefore real, since these particles can be easily detached due to the very weak bond between coating and materials.

In addition to the small size of these materials, their pulverulent nature also leads to a wide dispersal into the environment, causing concern. This is all the more so because it is currently impossible, given their exceptional properties and low production cost, to eliminate these materials from existing methods. Therefore, it is important to be able to obviate this toxicity without significantly reducing the properties of the materials or increasing their cost of formulation, and to develop new methods that are more environmentally friendly.

Furthermore, state-of-the-art $TiO_2$ particles are rarely photocatalytically active in visible light.

It is in this context that the invention is found.

DISCLOSURE OF THE INVENTION

The inventors have developed a method for attaching $TiO_2$ in situ inside or onto the surface of a support, enabling the development of new methods and the transformation of a $TiO_2$ into a non-pulverulent and non-nanometric form, while maintaining exceptional photocatalytic properties.

The present invention relates to a method for preparing an acidic aqueous reaction medium composed of from 80 to 100 mol % of $TiO_2$ and from 0 to 20 mol % of another oxide, from a titanium oxide precursor which is a titanium alkoxide, or a mixture of a titanium oxide precursor with at least one other precursor of another metal or semi-metallic oxide, the preparation being carried out in an acidic aqueous medium at a given pH, without using surfactant, and comprising the following steps:

a1) preparing and heating an acidic aqueous solution to a given pH between 0 and 6, and at a temperature of between 20° C. and 60° C., with no surfactant, by adding hydrochloric acid, a2) adding a titanium oxide precursor, or a mixture of a titanium oxide precursor and at least one other precursor of another oxide, to the acidic aqueous solution, a precipitate then forming, a3) agitating the aqueous reaction medium so as to dissolve the precipitate formed in step a2).

The present invention also relates to a method for producing a support at least micrometric in size and photocatalytically active at least in the visible range, containing crystals each composed of from 80 to 100 mol % of $TiO_2$ and from 0 to 20% of at least one other metal or semi-metallic oxide, comprising the following steps, starting from the acidic aqueous reaction medium defined above at a heating temperature of between 20° C. and 60° C.:

a4) a step of adding a titanium oxide precursor, or a mixture of a titanium oxide precursor and a precursor of the other oxide, in the acidic aqueous reaction medium, and a polymerization step (condensation of the precursors over the entire surface) on or inside the support (if the support is hollow), by:

spraying onto the support or immersing the support in the aqueous reaction medium, for a specific polymerization period of time, a5) a step of heating, the support making it possible to crystallize the crystals without using surfactant, in the aqueous reaction medium, a6) a step of rinsing with water and a step of recovering:

on the one hand, the support on which the crystallization took place, the crystals obtained being composed of from 80 to 100 mol % of $TiO_2$ and from 0 to 20 mol % of at least one other metal or semi-metallic oxide, these crystals being bonded by covalent bonds to the support, and on the other hand, a residual solution.

The present invention also relates to a support that is photocatalytically active at least in the visible range and at least micrometric in size, produced by the method defined above, having on the surface thereof crystals attached by covalent bonds, these crystals being composed of from 80 to 100 mol % $TiO_2$ and from 0 to 20 mol % of another metal or semi-metallic oxide.

The object of the invention thus makes it possible to make supports photocatalytically active by incorporating materials based on titanium oxide under mild conditions (complying with the criteria of green chemistry).

This innovative method has several advantages.

Firstly, it makes the supports photocatalytically active. These supports can be of a very diverse nature (polymers, carbon/graphite felts or activated charcoal, glasses, textiles, silicates, etc.), allowing many applications such as self-cleaning coatings, antibacterial air filters, reflective paints, etc.

Secondly, it attaches the titanium oxide-based nanocrystals to a surface with no loss of reactivity, thus preventing any risk of dispersal into the environment.

Thus, the present invention makes it possible to create a very strong bond between support and $TiO_2$ by directly developing the nanocrystals inside or on the surface of a support, without the risk of detaching and dispersal into the environment.

For certain applications that do not allow for in situ synthesis, such as paints, for example, the nanocrystals are developed on micrometric and macrometric supports, then added to the paint with no loss of reactivity.

It is also possible to spray the $TiO_2$ reaction medium directly onto the paint which then constitutes the support.

Among the applications described above, we have successfully developed reactive textiles (basalt-based textiles, carbon felts and also a fabric containing 65% polyester and 35% cotton), in particular in order to eliminate, in aqueous solution, dyes, and for some of them toluene (VOC found in the interior air of buildings), as well as glyphosate, a very problematic compound in recent years. We also developed reactive polystyrene to remove a dye in water. We also have evidence that our materials remain active despite their crystallization on micrometric and/or millimetric silica compounds, as well as construction materials such as sand (micrometric), suggesting that our technology can be used in construction.

There is a very broad range of applications since the crystallization of $TiO_2$-based materials can be done on a large number of supports.

Moreover, by virtue of the present invention, titanium oxide $TiO_2$ can be scaled to micrometric or millimetric scale without loss of reactivity, making it possible to resolve the problems related to its nanometric size in many other applications.

Another very important advantage of the invention is producing a support that is photocatalytically active in visible light, making this support attractive for many applications and in many fields.

DESCRIPTION OF THE DRAWINGS

This study was conducted with a $TiO_2$-based material (composed of from 80 to 100 mol % of $TiO_2$ and from 0 to 20 mol % of another oxide) on basalt textile fabric, on carbon felt, on polymers such as polystyrene, on a cotton/polyester support (chemist lab coat), on silica supports of variable macrometric and micrometric size (filtration silica and sand).

The organic pollutants used are methyl orange (concentration 10 mg/L (or ppm)) and blue bromophenol (concentration 20 mg/L (or ppm)), glyphosate and toluene (concentration 1 mg/L (or ppm)); and they were subjected to 3 hours of radiation (for example, with a Xenon 300 W lamp with UV filter).

This study shows that with the $TiO_2$ of the present invention, photocatalysis is possible with radiation in the visible range (which uses little energy to achieve it) and is greater than with a less active commercial $TiO_2$ alone. Most studies show that the state-of-the-art $TiO_2$s in particular enable photocatalysis with UV radiation, which uses more energy to achieve it than radiation in the visible range.

Figure 1:
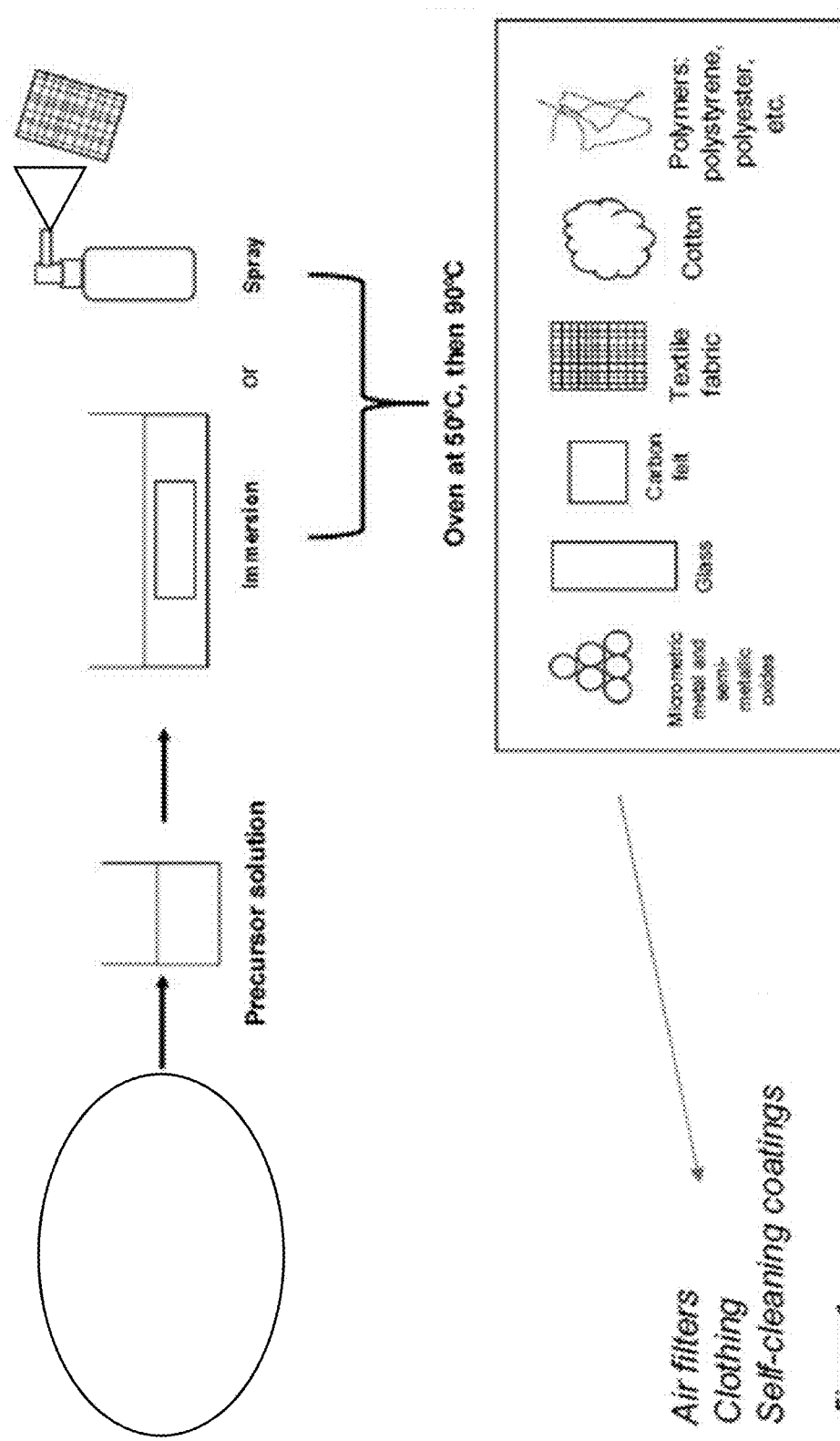
Figure 2:
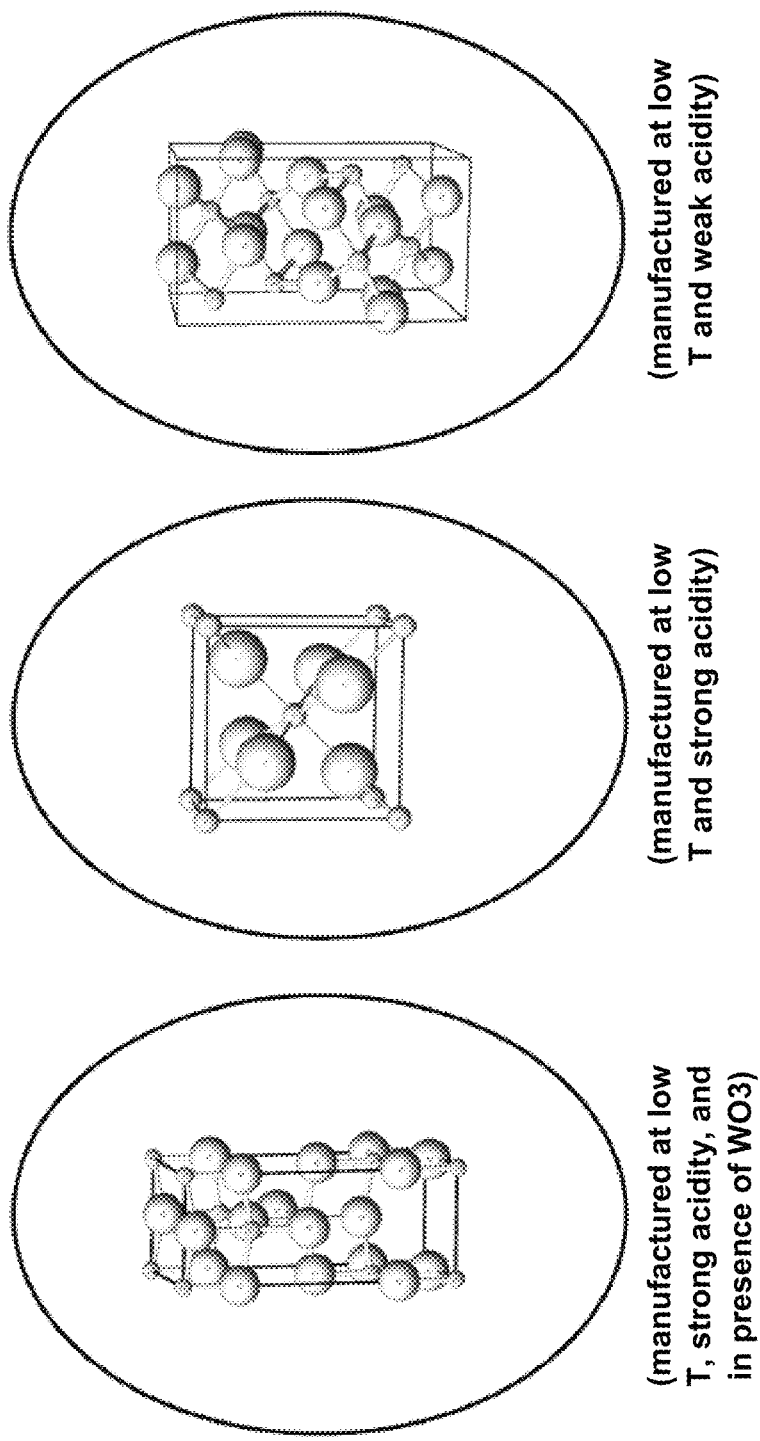
Figure 3:
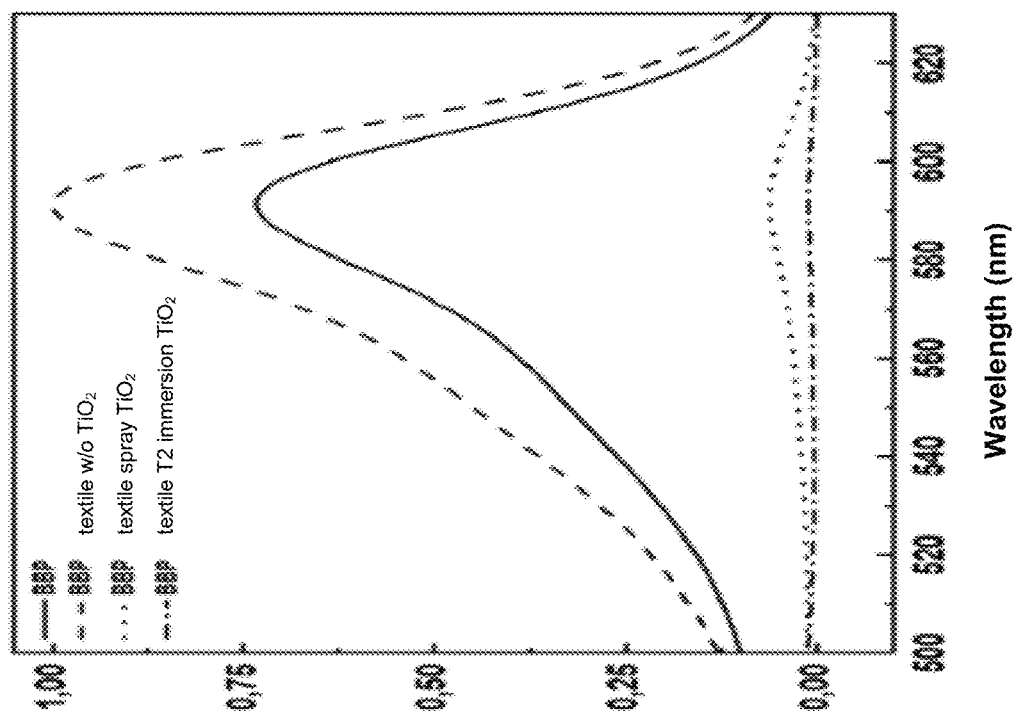
Figure 3:
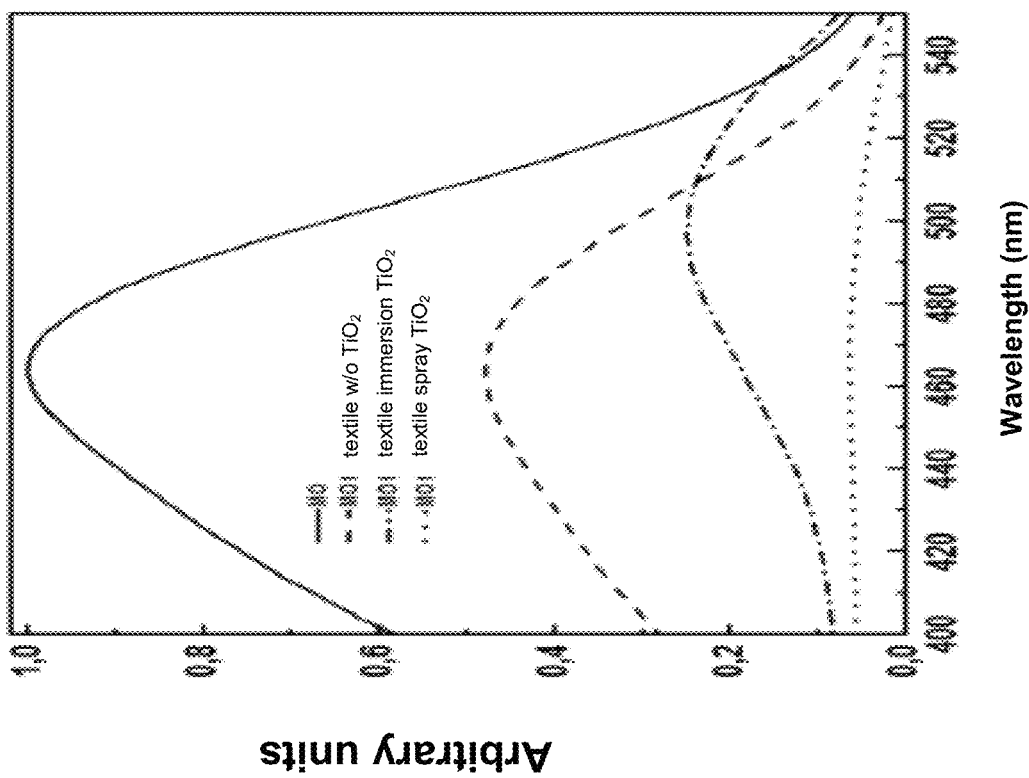
Figure 4:
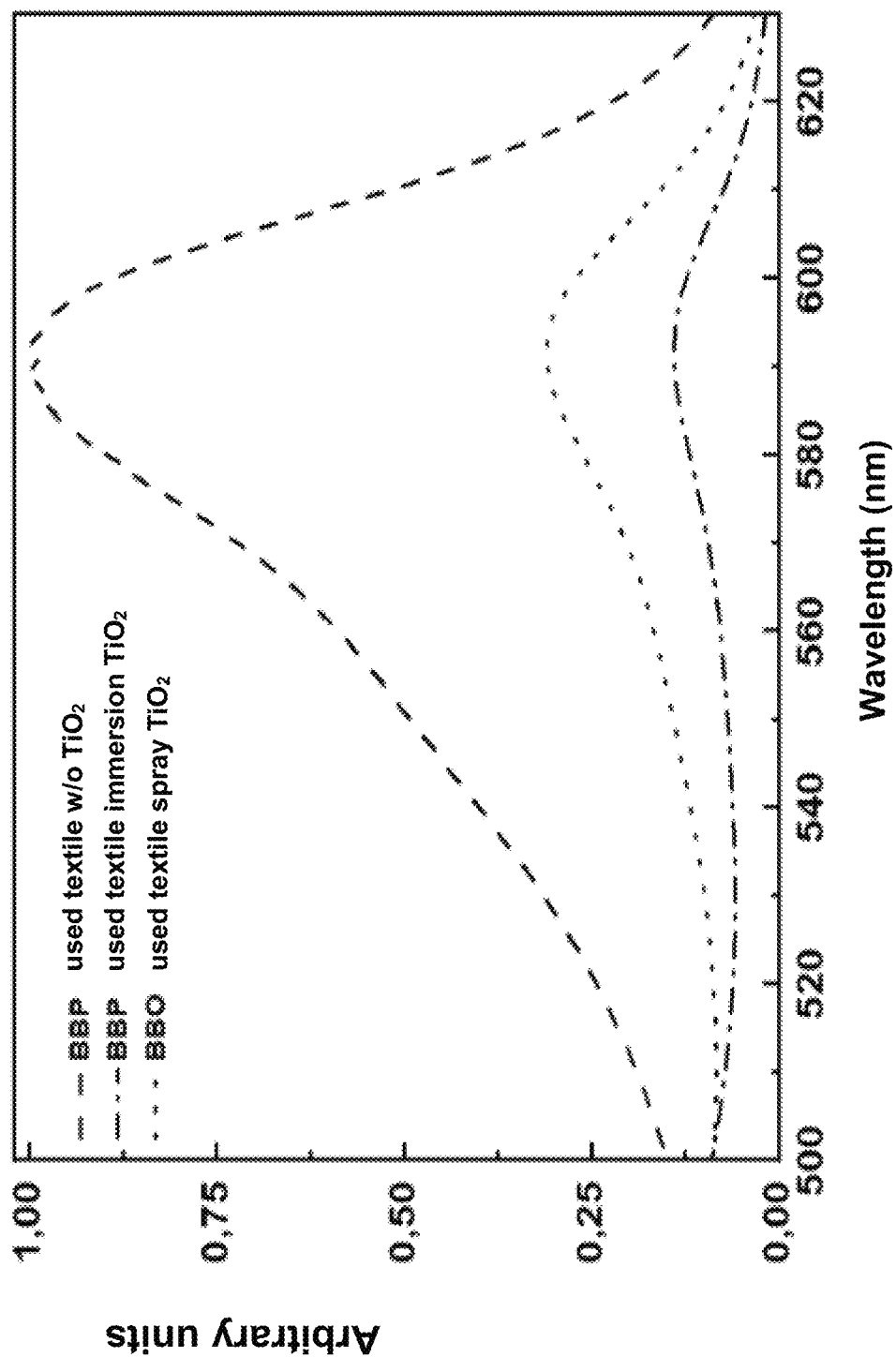
Figure 5:
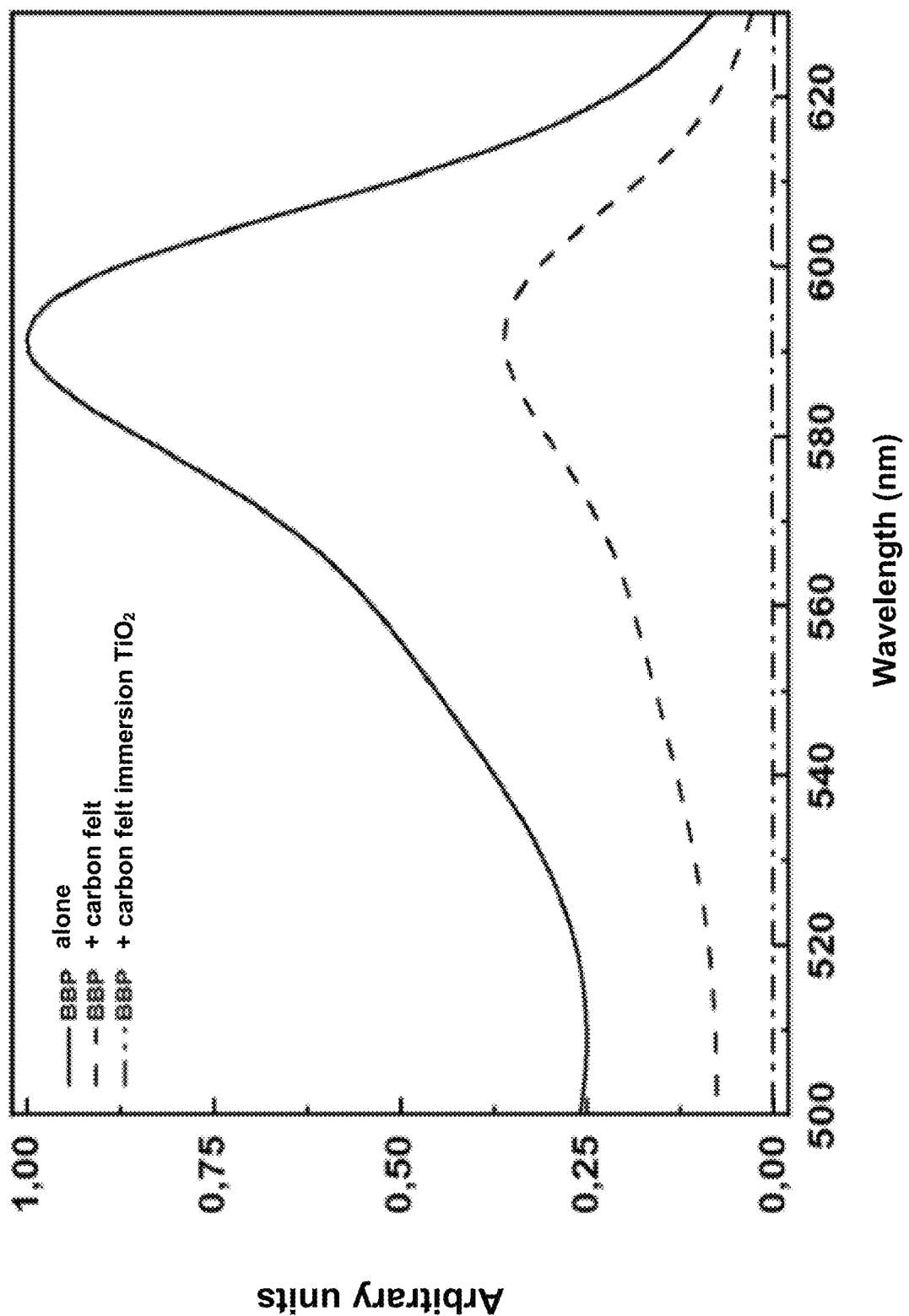
Figure 6:
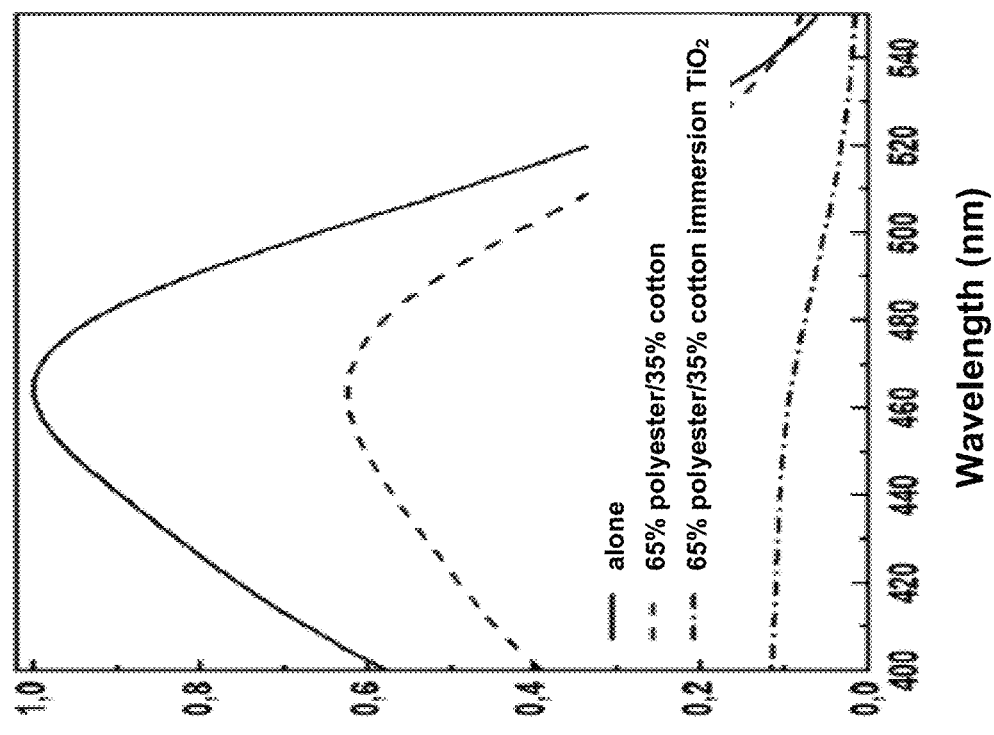
Figure 6:
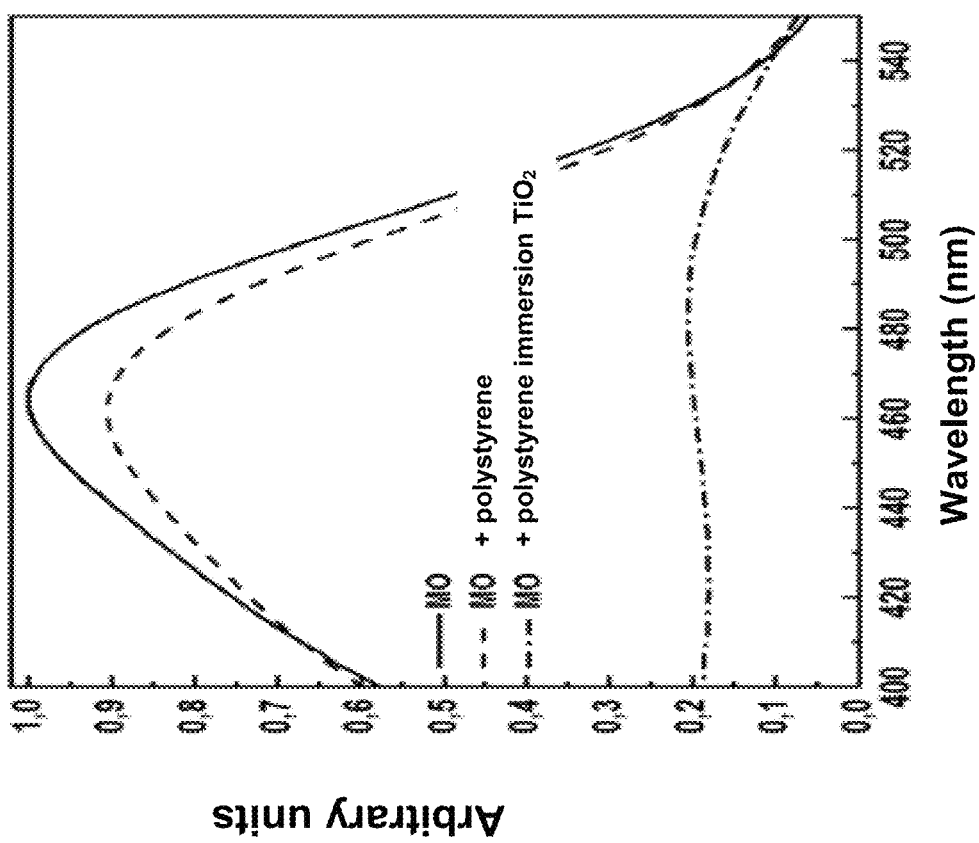
Figure 7:
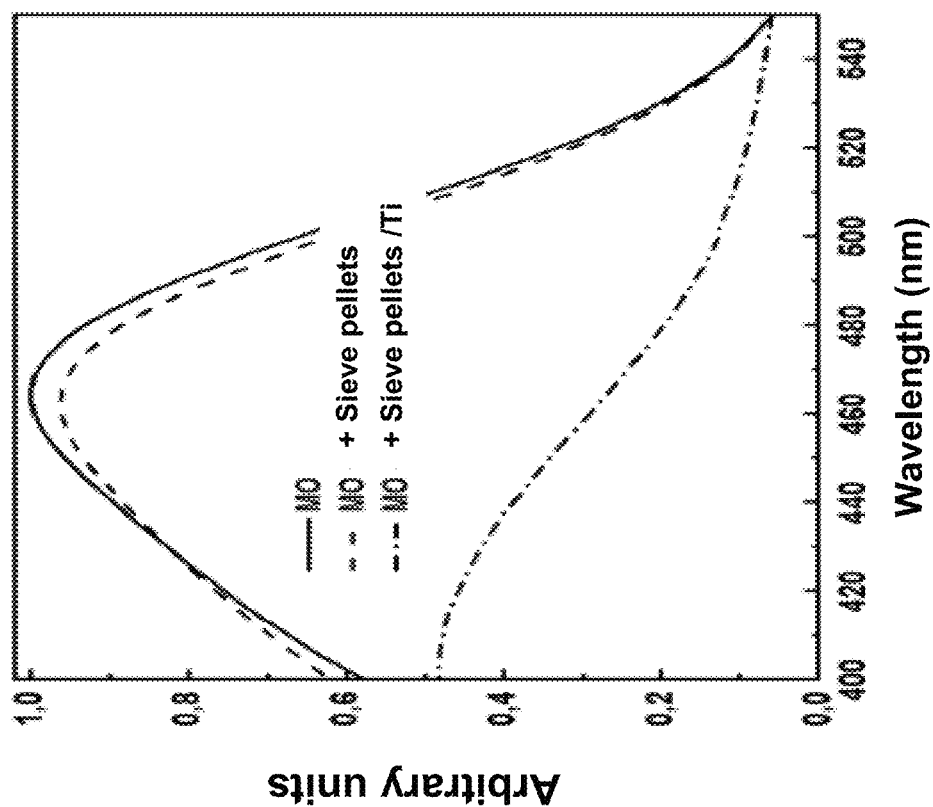
Figure 7:
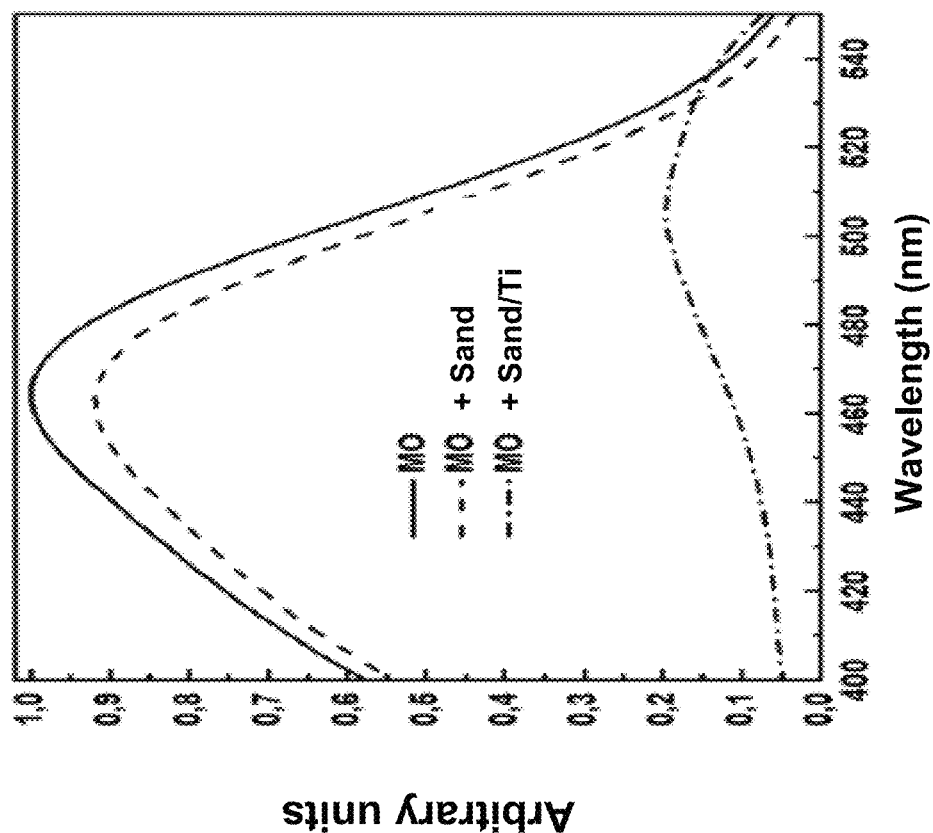
Figure 8:
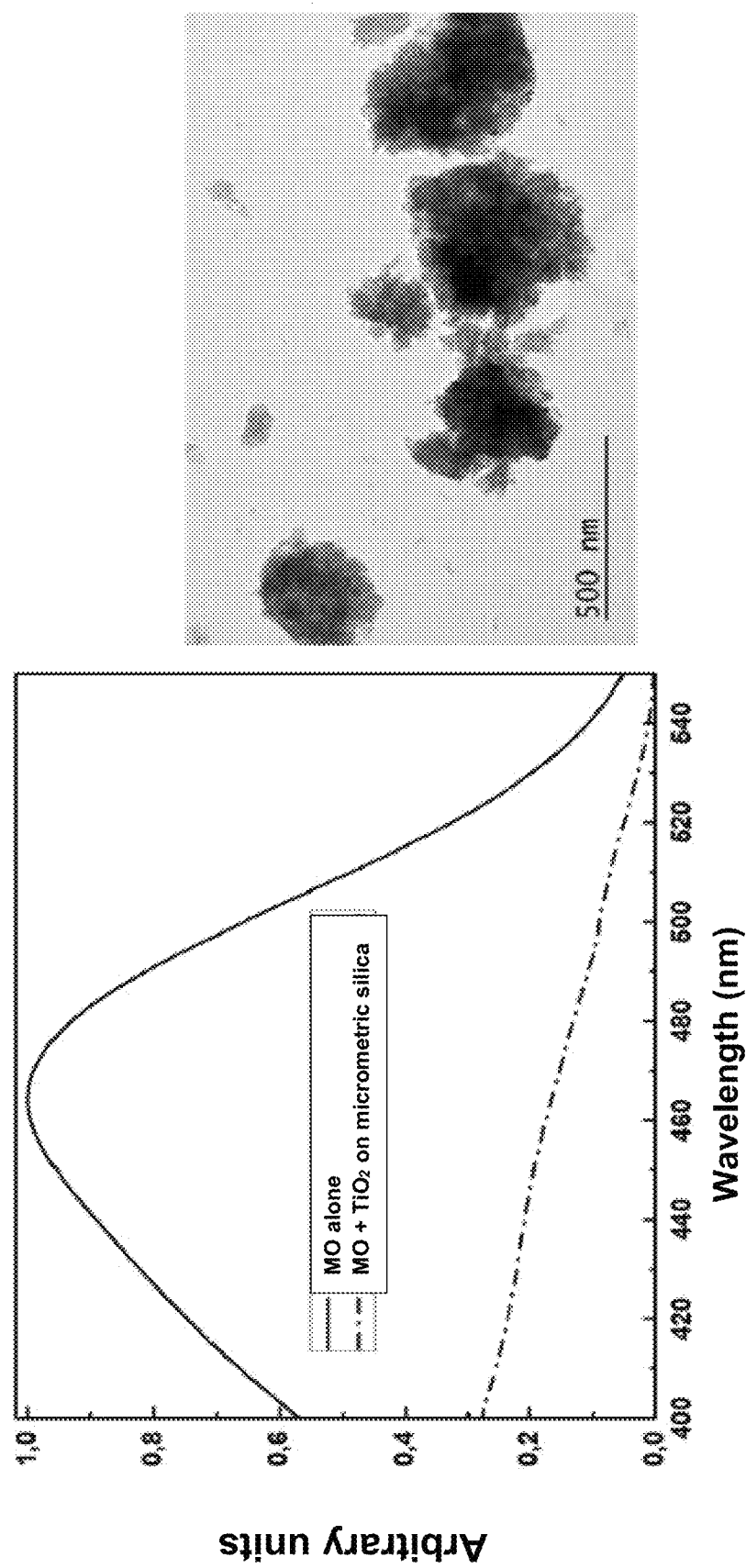
Figure 10:
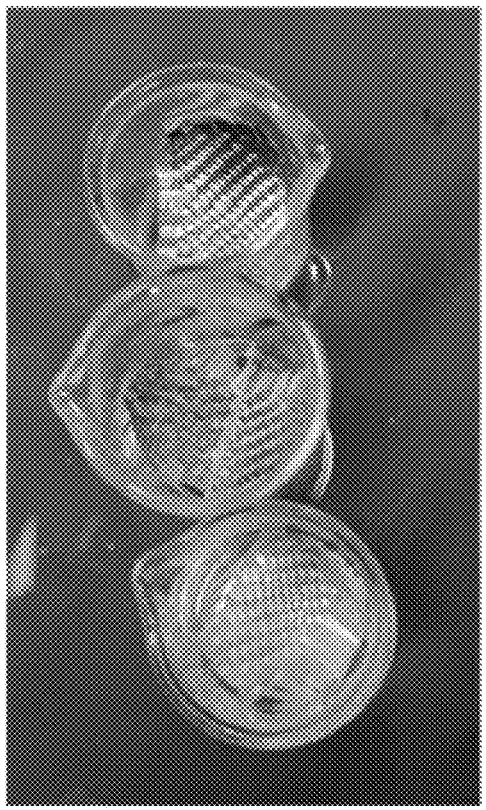
Figure 9:
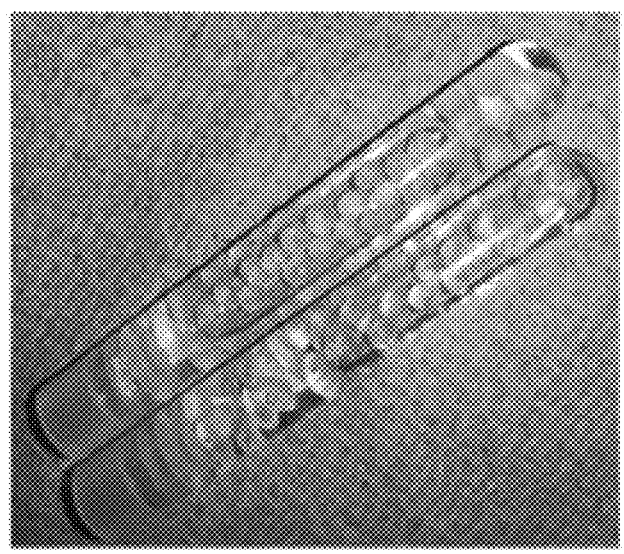
Figure 11:
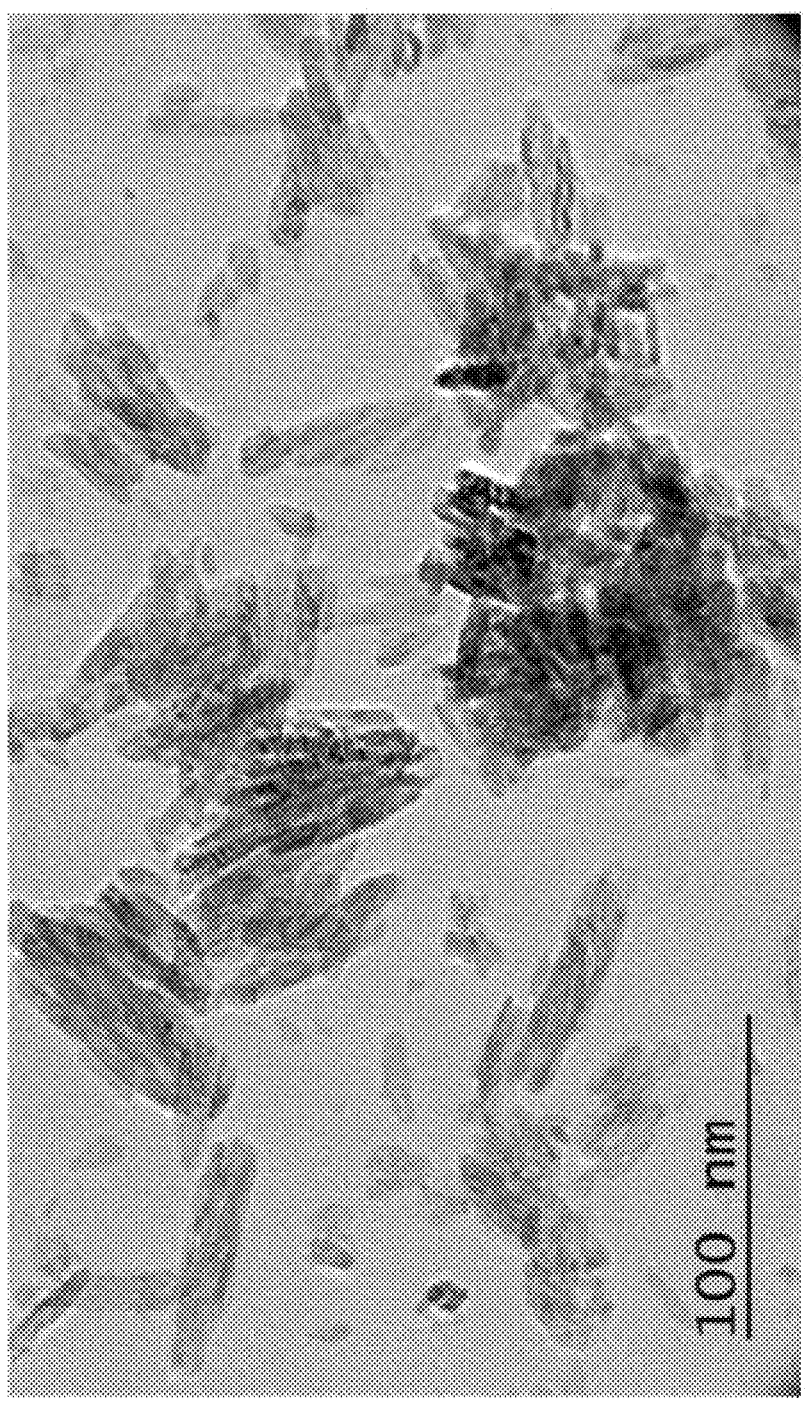
Figure 12A:
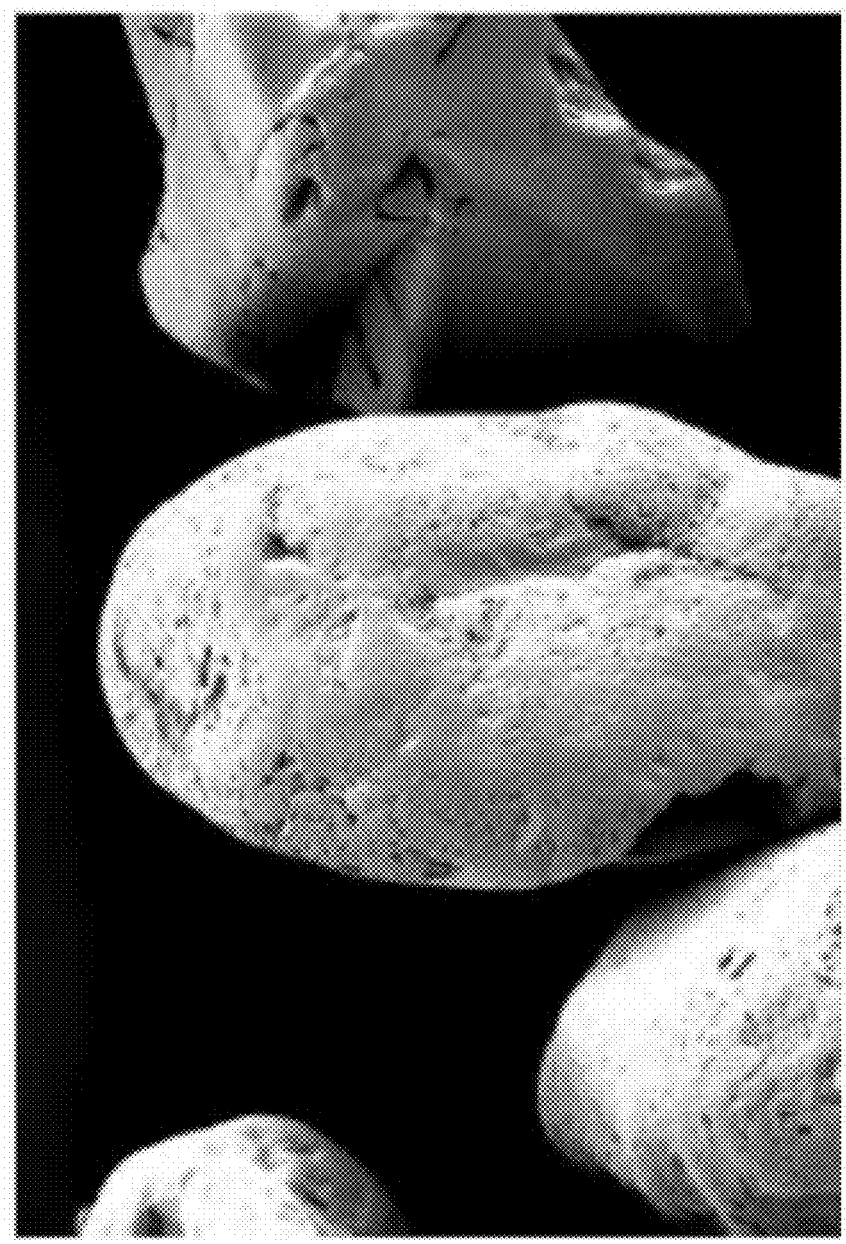
Figure 12B:
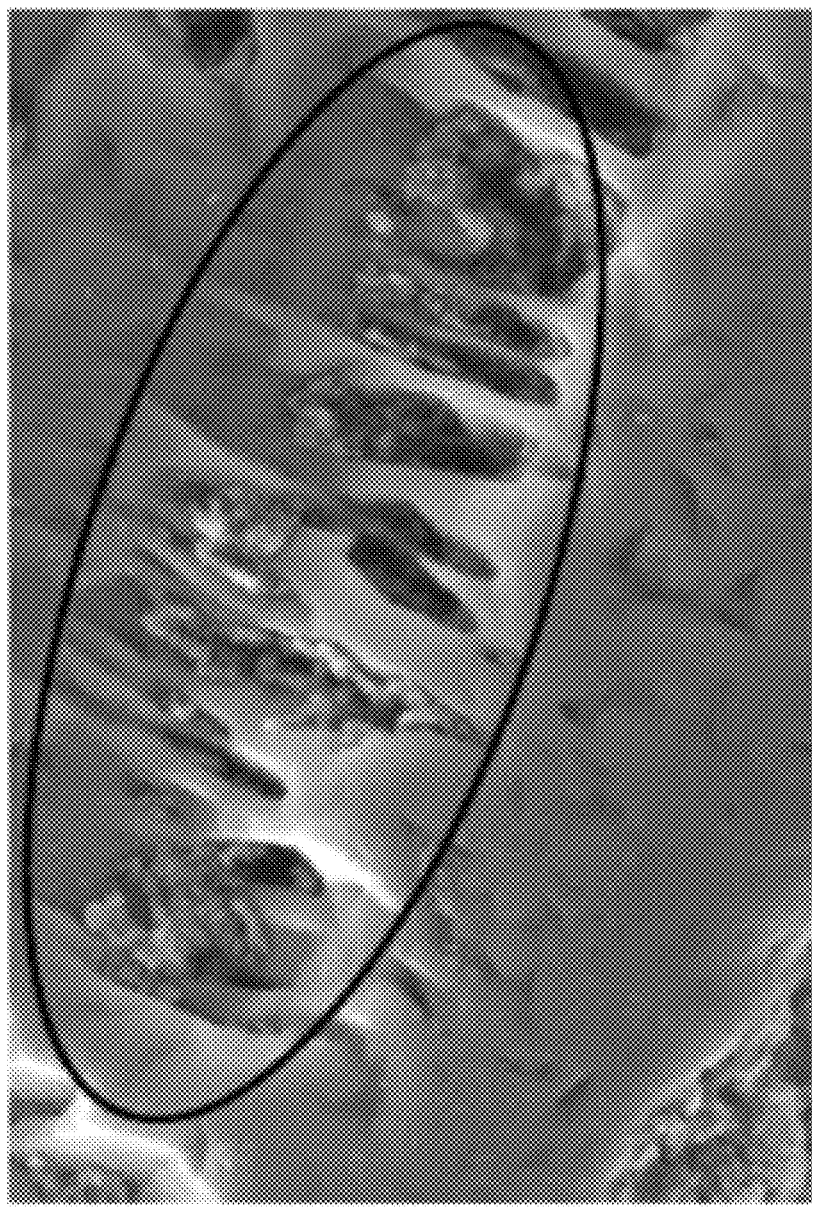

The features and advantages of the invention will emerge from the following detailed description, with reference to drawings which are nonlimiting and given by way of illustration, among which:

FIG. 1 shows an application diagram of the $TiO_2$-based materials on support;

FIG. 2 represents the three $TiO_2$-based crystalline structures obtained by virtue of the invention;

FIG. 3 shows a graph illustrating the breakdown of the dyes (methyl orange—MO, bromophenol blue—BBP) on basalt textile fabric; FIG. 3 shows the adsorption of the dye molecules on the untreated textile but greater efficacy in the presence of nanocrystals; the nanocrystals are securely attached in the fibers, and there is no $TiO_2$ in the solution;

FIG. 4 shows a graph illustrating the breakdown of bromophenol blue (BBP) concentrated on previously used basalt textile fabric (recycling); FIG. 4 shows that the reuse of textiles is possible without loss of activity, as well as the long lifespan of the textiles;

FIG. 5 shows a graph illustrating the breakdown of bromophenol blue (BBP) on carbon felt; FIG. 5 shows the adsorption of BBP molecules on carbon felt, but even more reactivity (total disappearance of organic molecules in solution) in the presence of $TiO_2$; the nanocrystals are securely attached in the felt, and there is no $TiO_2$ in the solution;

FIG. 6 shows a graph illustrating the breakdown of methyl orange (MO) on polystyrene and on a polyester/cotton mixture (65%/35%); FIG. 6 shows a polystyrene and polyester/cotton mixture made reactive with the addition of $TiO_2$; the nanocrystals are securely attached on these two supports, and there is no $TiO_2$ in the solution;

FIG. 7 shows a graph illustrating the breakdown of methyl orange (MO) on Fontainebleau sand and sieve pellets (mixture of $Al_2O_3$ and $Fe_2O3$); the sand and granules are made reactive with the addition of $TiO_2$; $TiO_2$ adheres to $SiO_2$-based supports but also containing $Al_2O_3$, $Fe_2O_3$ on the micrometric scale; the nanocrystals are securely attached to these two supports, and there is no $TiO_2$ in the solution;

FIG. 8 represents a graph illustrating the breakdown of methyl orange (MO) on filtration silica (micrometric); micrometric silica is made reactive with the addition of $TiO_2$; $TiO_2$ adheres to $SiO_2$-based supports on the micrometric scale; the silica was treated with CuII grafting before treatment with $TiO_2$ to improve the amount of silanol groups on the surface, the reaction occurring with no increase in silanol groups;

FIG. 9 represents polystyrene beads alone with methyl orange (left) at t=0, and polystyrene/Ti beads with methyl orange after radiation;

FIG. 10 represents photos taken after radiation and drying of the textile: textile without Ti with bromophenol blue (top), textile/Ti immersion with bromophenol blue (middle), textile/Ti by spray with bromophenol blue (bottom);

FIG. 11 represents an image in transmission electron microscopy—Activated carbon/Ti;

FIGS. 12a and 12b represent scanning electron microscopy images—sand/Ti. FIG. 12a corresponds to an image of a sand grain/Ti with an image width of 413 μm and FIG. 12b corresponds to an image of the sand grain/Ti with an image width of 16.99 μm and shows $TiO_2$ crystals attached to the surface.

DETAILED DESCRIPTION OF THE INVENTION

The present invention relates to a method for preparing an aqueous reaction medium composed of from 80 to 100 mol % of $TiO_2$ and from 0 to 20 mol % of another oxide, from a titanium oxide precursor which is a titanium alkoxide, or from a mixture of this titanium oxide precursor with at least one other precursor of another metal or semi-metallic oxide.

In an alternative not described here, the titanium oxide precursor could be chosen from $Na_2Ti_3O_7$ or a derivative.

The preparation is carried out in an acidic aqueous medium at a given pH, without using surfactants, and comprises the following steps:

a1) preparing and heating an acidic aqueous solution to a given pH of between 0 and 6, and at a temperature of between 20° C. and 60° C., with no surfactant, by adding hydrochloric acid, a2) adding a titanium oxide precursor, or a mixture of a titanium oxide precursor and at least one other precursor of another oxide to the acidic aqueous solution, a precipitate then forming, a3) vigorous agitation of the aqueous reaction medium so as to dissolve the precipitate formed in step a2).

Advantageously, hydrochloric acid is added, for example between 30% and 37% by weight/volume.

In a first embodiment of the method, in step a1) the pH of the reaction medium is chosen around 5 so as to obtain nanocrystals on the support having a stable Brookite crystalline form, and photocatalytically reactive at least in the visible range.

In a second embodiment of the method, in step a1), the pH of the reaction medium is chosen around 0-2 so as to obtain nanocrystals having a Rutile crystalline form, and which are photocatalytically reactive at least in the visible range.

The metal or semi-metallic oxide may be chosen from $SiO_2$, $ZrO_2$, $Al_2O_3$, $Fe_2O_3$, $CeO_2$, MgO, ZnO, CuO, NiO.

In a third embodiment of the method, the other metal oxide being $WO_3$, and in step a1), the pH of the reaction medium is between 0 and 1 so as to obtain nanocrystals having an Anatase crystalline form of at least 90%, photocatalytically reactive at least in the visible range.

The present invention also relates to a method for producing a support that is at least micrometric in size and photocatalytically active at least in the visible range (and even more so in the UV range), containing nanocrystals each composed of from 80 to 100 mol % of $TiO_2$ and from 0 to 20 mol % of at least one other metal or semi-metallic oxide.

This method for producing the support comprises the following additional steps, starting from the acidic aqueous reaction medium obtained above at a heating temperature of between 20° C. and 60° C.:

a4) a step of reaction between the precursors (titanium oxide precursor, or a mixture of a titanium oxide precursor and a precursor of the other oxide) obtained in step a3) and the support, in order to condense the precursors that attach thereto by covalent bonds on its surface, on or inside the support, by:
  spraying onto the support or
  immersing the support in the aqueous reaction medium for the specific duration of the synthesis,
a5) a step of heating,
the support allowing the nanocrystals to crystallize, without using surfactant, in the aqueous reaction medium,
a6) a step of rinsing in water and recovery:
on the one hand, of the support on which the crystallization took place, the nanocrystals obtained being composed of from 80 to 100 mol % of $TiO_2$ and from 0 to 20 mol % of at least one other metal or semi-metallic oxide, these nanocrystals being attached to the support by covalent bonds,
and on the other hand, of a residual solution.

Thus, the invention makes it possible to produce photocatalytically active supports by incorporating materials based on titanium oxide under mild conditions (no surfactant, aqueous medium, requiring little energy, without excessive temperatures), This residual solution could be re-implanted in the reaction medium for a new synthesis depending on whether or not the stoichiometry of the reaction with titanium alkoxide and the surface was complete.

For silica, the surface was prepared upstream of step a4) in order to increase the attachment points (O—) (Cull grafting).

All the steps of the method can be carried out in open air, i.e., in contact with ambient air. Advantageously, in a non-limiting manner, the acidic aqueous solution is produced without cosolvent, such as alcohol.

The agitation of the acidic aqueous reaction medium can be carried out until the disappearance of the precipitate.

The agitation of the acidic aqueous reaction medium can be carried out between 800 and 1200 rpm.

Advantageously, the technique used is not dip coating.

When a support is added, the condensation reaction of the surfactant-free precursors in step a4) is very fast and is performed between 30 and 90 minutes. $TiO_2$ precursors will make covalent bonds that attach to the surface on or inside the support in order to subsequently grow crystals.

In the present invention, the $TiO_2$ precursors are formed after a first formation of precipitate, which is vigorously agitated in order to dissolve it in the medium. Then, in this medium, the $TiO_2$ precursors attach to the support on the surface thereof, on or inside, and crystallize only on the surface of the support in a single step. In other words, in the present invention, $TiO_2$ precursors crystallize and grow only after attaching to the support.

Furthermore, the nanocrystals obtained on the support are generally more heterogeneous in shape and size than the nanocrystals obtained with no support and no surfactant, with only the acidic aqueous reaction medium.

Step a5) may have:
  a first sub-step of heating from 30° to 60° C. for a given first period of time;
  a second sub-step of heating from 50° to 90° C. for a second period of time.

For example,
  for the first heating sub-step of step a5), the first heating time may be several hours;
  for the second heating sub-step of step a5), the second heating time may be several hours.

In step a5), the specific heating time can be at least 24 hours to make the material active and crystalline. It should be noted that crystallization can be performed at room temperature or at a higher temperature, below a temperature for which the crystal morphology would change.

Furthermore, in step a6), the support/materials provided with TiO2-based nanocrystals can be immersed in a $HNO_3$ bath (optional step), then rinsed in water (to remove the unattached particles).

Thus, during steps a4) and a5), there are condensation reactions, then crystallization, and finally growth in the size of the crystals and homogenization.

The $TiO_2$ obtained very early may be composed, for example, of very small crystals approximately 5 nm squared, while that of 24 hrs at 50° C. and 24 hrs at 90° C. has homogeneous rod-shaped crystals 5 nm by 25 nm.

Advantageously, the duration of the condensation reaction (polymerization) of step a4) is less than 90 minutes, and the heating temperature is between 40° C. and 95° C., for a heating time of at least 24 hours during the heating step a5).

Advantageously, the support is millimetric, centimetric or metric in size.

The support may consist of the following material: polymers (polystyrene, polyester); carbon felt/graphite or active charcoal; glass; textile (cotton, basalt); micrometric silicates (filtration silica, sand); cement.

To create the support, in step a1):

the pH is chosen around or equal to 5 so as to obtain nanocrystals on the support having a stable Brookite crystalline form, or the pH is between 0 and 2 so as to obtain nanocrystals having a Rutile crystalline form.

The support at least micrometric in size may comprise, like the metal or semi-metallic oxide associated with the $TiO_2$, the following metal oxides from the list: $SiO_2$, $ZrO_2$, $Al_2O_3$, $Fe_2O_3$, $CeO_2$, MgO, ZnO, CuO, NiO.

In another embodiment, the other metal oxide associated with the $TiO_2$ is $WO_3$, and in step a1), the pH is between 0 and 2 so as to obtain nanocrystals having an Anatase crystalline form of at least 90%, photocatalytically reactive at least in the visible range.

When the nanocrystals are produced on the support by immersion of the support in the aqueous reaction medium, the steps of the method can be defined more precisely as follows:

the support is placed in an oven at 50° C. in a hermetically-sealed container (to avoid any evaporation), under static conditions, for at least 24 hours, then 90° C. for at least 24 hours, the support is then thoroughly rinsed with water.

The support can then be dried in an oven at 50° C.

Advantageously, depending on the nature of the support and the type of oxides present, in order to increase the reactivity and if the support allows it, but not required and non-limiting, the support may then be either:

(a) immersed in a 64% nitric acid bath for 10 minutes, thoroughly rinsed with water and then dried, or (b) immersed in an ammonia metal solution, from among $Ag^+$, $Cu^{2+}$, $Ni^{2+}$, $Zn^{2+}$, $Al^{3+}$, $Mg^+$, for 10 minutes, rinsed with water, dried at room temperature, then immersed in a nitric acid bath, for example at 64% and for 10 minutes, thoroughly rinsed with water.

When the nanocrystals are produced on the support by immersion of the support in the acidic aqueous reaction medium, the steps of the method may be defined more precisely as follows:

the support is immersed in the reaction medium;

depending on its nature and composition, the support is either:

1) placed in the oven under static conditions, or
2) kept in the reaction medium with moderate agitation (400 rpm); in both cases, the temperature of the medium is kept at 50° C. for at least 24 hours and then at 90° C. for at least 24 hours;

the support is then thoroughly rinsed with water.

The support can then be dried in an oven at 50° C.

Then, advantageously, but not required and non-limiting, in order to increase the reactivity and if the support allows it, the support may then be either:

a) immersed in a 64% nitric acid bath for 10 minutes, thoroughly rinsed with water and then dried at room temperature, b) immersed in a metal solution with a pH between 10.5 and 11.5, from among $Ag^+$, $Cu^{2+}$, $Ni^{2+}$, $Zn^{2+}$, $Au^{2+}$, $Al^{3+}$, $Mg^+$, for 10 minutes, rinsed with water, dried at room temperature, then immersed in a 64% nitric acid bath for 10 minutes, rinsed thoroughly with water, then finally dried again at room temperature.

The present invention also relates to the use of the photocatalytically active support with crystallized nanocrystals on the surface thereof, for the photocatalytic breakdown of compounds.

The compounds may be chosen from dyes, pharmaceutical active ingredients, herbicides, pesticides, fungicides, hormones, hydrocarbons and volatile organic compounds such as formaldehyde, and BTEX.

Thus, the breakdown of glyphosate and toluene from $TiO_2$ according to the present invention is illustrated.

Breakdown of glyphosate on a basalt-based textile tissue, for example, in 3 hours:

| Types | CO (ppm) | C (ppm) | Efficacy (%) | Efficacy (ppm/mg or ppm/cm$^2$) |
|---|---|---|---|---|
| Textile without Ti | 1 | 1 | 0 | 0 |
| Textile/Ti | 1 | 0.49 | 51% | 0.17 |
| Glyphosate | 1 | 1 | — | — |

The presence of $TiO_2$ on the textile is essential for eliminating glyphosate molecules.

The nanocrystals are securely attached to the support, and there is no $TiO_2$ in the solution.

Breakdown of toluene on basalt-based textile:

| Types | CO (ppm) | C (ppm) | Efficacy (%) | Efficacy (ppm/cm$^2$) |
|---|---|---|---|---|
| Textile without Ti | 1 | 0.49 | 51 | 0.17 |
| Textile/Ti | 1 | 0.36 | 64 | 0.21 |
| Toluene | 1 | 1 | — | — |

The $TiO_2$ supply improves the elimination of the toluene.

The nanocrystals are securely attached to the textile, and there is no $TiO_2$ in the solution.

Several applications are possible, for example:
1) air quality, particularly indoor (breakdown of VOCs), with the development of paints or air filters,
2) water pollution control (breakdown of molecules such as BTEX, pesticides, dyes, etc.),
3) anti-fouling or anti-stain paint, with the development of paints, antibacterial treatment with the development of air filters, self-cleaning coatings (glass, cement, sand, etc.).

The invention claimed is:

1. A method for producing a photocatalyst support at least micrometric in size and photocatalytically active at least in the visible range, containing nanocrystals each composed of from 80 to 100 mol % of $TiO_2$ and from 0 to 20 mol % of at least one other metal or semi-metallic oxide, comprising the following steps that are performed without using a surfactant:

a1) preparing and heating an acidic aqueous solution to a pH between 0 and 6, and to a temperature between 20° C. and 60° C., with no surfactant, by adding hydrochloric acid, a2) adding a titanium oxide precursor, or a mixture of a titanium oxide precursor and of at least one other precursor of another metal or semi-metallic oxide, to the acidic aqueous solution to form a precipitate in the acidic aqueous reaction medium, wherein the precipitate comprises from 80 to 100 mol % of $TiO_2$ and from 0 to 20 mol % of another oxide, and wherein the titanium oxide precursor is a titanium alkoxide, a3) agitating the acidic aqueous reaction medium so as to dissolve the precipitate formed in step a2), a4) reacting the precursors obtained in step a3) with a support to condense the precursors to the surface of the support and thereby attach the precursors to the surface of the support by covalent bonds, wherein the precursors are attached by:

spraying the precursor aqueous reaction medium on the support or immersing the support in the precursor aqueous reaction medium for a specific time period, a5) heating the mixture obtained in step a4) at a temperature between 40° C. and 95° C., wherein the support is at least micrometric in size, making it possible to crystallize the titanium oxide precursors, or the mixture of the titanium oxide precursor and the at least one other precursor of another metal or semi-metallic oxide, on the surface of the support without using a surfactant in the acidic aqueous reaction medium, wherein the precursors crystallize once attached to the surface of the support, a6) rinsing in water and recovering the support on which the crystallization took place, wherein nanocrystals are formed as a result of the crystallization and wherein the nanocrystals are composed of from 80 to 100 mol % of $TiO_2$ and from 0 to 20 mol % of at least one other metal or semi-metallic oxide and the nanocrystals are attached to the support by covalent bonds, wherein recovering the support also produces a residual solution.

2. The method for producing a support according to claim 1, wherein the method is carried out in open air.

3. The method for producing a support according to claim 1, wherein the acidic aqueous reaction medium is produced without cosolvent.

4. The method for producing a support according to claim 3, wherein the acidic aqueous reaction medium is produced without alcohol.

5. The method for producing a support according to claim 1, wherein step a5) has:
a first sub-step of heating from 30° C. to 60° C. for a given first period of time;
a second sub-step of heating from 50° C. 90° C. for a second period of time.

6. The method for producing a support according to claim 5, wherein:
for the first heating sub-step of step a5), the first heating time is at least several hours; for the second heating sub-step of step a5), the second heating time is at least several hours.

7. The method for producing a support according to claim 6, wherein:
for the first heating sub-step of step a5), the first heating time is at least 24 hours;
for the second heating sub-step of step a5), the second heating time is at least 24 hours.

8. The method for producing a support according to claim 1, wherein in step a1):
the pH is 5 to obtain nanocrystals on the support having a stable Brookite crystalline form,
or the pH is between 0 and 2 se as to obtain nanocrystals having a Rutile crystalline form.

9. The method for producing a support according to claim 1, wherein the metal or semi-metallic oxide is selected from the group consisting of $SiO_2$, $ZrO_2$, $Al_2O_3$, $Fe_2O_3$, $CeO_2$, MgO, ZnO, CuO, and NiO.

10. The method for producing a support according to claim 1, wherein the metal or semi-metallic oxide is $WO_3$, and in step a1), the pH is between 0 and 1, to obtain nanocrystals having an Anatase crystalline form of at least 90%.

11. The method for producing a support according to claim 1, wherein in step a6), the support is:
(a) immersed in a nitric acid bath, rinsed with water and then dried, or
(b) immersed in a metal solution among $Ag^+$, $Cu^{2+}$, $Ni^{2+}$, $Zn^{2+}$, $Al^{3+}$, and $Mg^+$, rinsed with water, dried at ambient temperature, then immersed in a nitric acid bath and rinsed.

* * * * *